(12) United States Patent
Lille et al.

(10) Patent No.: US 8,427,772 B2
(45) Date of Patent: Apr. 23, 2013

(54) PATTERNED-MEDIA MAGNETIC RECORDING DISK DRIVE WITH DATA ISLAND MISPLACEMENT INFORMATION IN THE SERVO SECTORS

(75) Inventors: Jeffey S. Lille, Sunnyvale, CA (US); Ricardo Ruiz, San Bruno, CA (US)

(73) Assignee: HGST Netherlands B.V., Amsterdam (NL)

(*) Notice: Subject to any disclaimer, the term of this patent is extended or adjusted under 35 U.S.C. 154(b) by 466 days.

(21) Appl. No.: 12/782,383

(22) Filed: May 18, 2010

(65) Prior Publication Data
US 2011/0286125 A1    Nov. 24, 2011

(51) Int. Cl.
*G11B 5/09*    (2006.01)
*G11B 21/02*    (2006.01)

(52) U.S. Cl.
USPC .................................. 360/51; 360/48; 360/75

(58) Field of Classification Search .................. None
See application file for complete search history.

(56) References Cited

U.S. PATENT DOCUMENTS

| 7,492,540 | B2 | 2/2009 | Albrecht |
| 2009/0003144 | A1 | 1/2009 | Mallary et al. |
| 2009/0244765 | A1 | 10/2009 | Albrecht |
| 2009/0308837 | A1 | 12/2009 | Albrecht et al. |

FOREIGN PATENT DOCUMENTS

| JP | 2004199809 | 7/2004 |
| JP | 2009245488 | 10/2009 |
| JP | 2009289391 | 12/2009 |

*Primary Examiner* — Regina N Holder
(74) *Attorney, Agent, or Firm* — Thomas R. Berthold

(57) ABSTRACT

A disk drive with patterned-media disks has information recorded in the servo sectors that identifies misplacement of the data islands in the data regions between the servo sectors. This misplacement information is read from the servo sectors prior to writing to correct either or both the radial position of the write head and the timing of the write pulses to the data islands. The misplacement information may include radial deviation of the data tracks, circumferential or along-the-track misplacement of the data islands, or the location of defective data islands.

17 Claims, 10 Drawing Sheets

| TRACK #(TR) | SKEW ANGLE (α) | RADIAL OFFSET (Re) | HEAD CIRCUMFERENTIAL OFFSET (HCO) |
|---|---|---|---|
| | | | |
| TR(n) | α(n) | Re(n) | HCO(n) |
| TR(n+10) | α(n+10) | Re(n+10) | HCO(n+10) |
| TR(163b) | α(163b) | Re(163b) | HCO(163b) |
| TR(163a) | α(163a) | Re(163a) | HCO(163a) |
| TR(n+20) | α(n+20) | Re(n+20) | HCO(n+20) |
| TR(n+30) | α(n+30) | Re(n+30) | HCO(n+30) |
| | | | |

PATTERNED-MEDIA MAGNETIC RECORDING DISK DRIVE WITH DATA ISLAND MISPLACEMENT INFORMATION IN THE SERVO SECTORS

BACKGROUND OF THE INVENTION

1. Field of the Invention

This invention relates generally to magnetic recording disk drives for use with patterned media, wherein each data bit is stored in a magnetically isolated island on the disk, and more particularly to such a disk drive that compensates for misplacement of the data islands.

2. Description of the Related Art

Magnetic recording hard disk drives with patterned magnetic recording media have been proposed to increase the data density. In patterned media, the magnetic material on the disk is patterned into small isolated data islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned islands, the magnetic moment of the regions between the islands must be destroyed or substantially reduced so as to render these regions essentially nonmagnetic. Alternatively, the media may be fabricated so that that there is no magnetic material in the regions between the islands.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced by a relatively low-cost, high volume nanoimprinting process using a master template, sometimes also called a "stamper", that has a topographic surface pattern. In this method the magnetic recording disk substrate with a polymer film on its surface is pressed against the master template. The polymer film receives the reverse image of the template pattern and then becomes a mask for subsequent etching of the disk substrate to form the pillars on the disk. The magnetic recording layer material is then deposited over the entire surface of the etched substrate to cover both the ends of the pillars and the trenches. The trenches are recessed far enough from the read/write head to not adversely affect reading or writing, or the material in the trenches is "poisoned" so as to be nonmagnetic. Nanoimprinting of patterned media is described by Bandic et al., "Patterned magnetic media: impact of nanoscale patterning on hard disk drives", *Solid State Technology* S7+ *Suppl. S,* September 2006; and by Terris et al., "TOPICAL REVIEW: Nanofabricated and self-assembled magnetic structures as data storage media", *J. Phys. D: Appl. Phys.* 38 (2005) R199-R222.

In patterned media, because the data islands are single-domain, the transitions between bits occur only between the islands. Since the magnetic transitions are restricted to pre-determined locations governed by the locations of individual data islands, it is necessary that the data islands be precisely located on the disk so that the write pulses from the write head are synchronized with the passing of individual data islands past the head. It is also important that the individual data tracks be precisely aligned so that the heads can be positioned to the correct data tracks.

The placement of the data islands and data tracks relative to one another is established when the master template for nanoimprinting the disks is produced. This is typically done using a rotary-stage e-beam lithography system, in which the master pattern for the patterned data tracks is produced on a track-by-track basis, or by groups of tracks at a time. Drifts and offsets in the e-beam machine, which change with time, will result in misplacement of features on the master template, and thus misplacement of the data islands on the nanoimprinted disks. Guided self-assembly of block copolymers, alone or together with e-beam lithography, has also been proposed for making the master template for nanoimprinting the disks. A self-assembling block copolymer typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. If one of the components A or B is selectively removable without having to remove the other, then an orderly arranged structural units of the un-removed component can be formed, which is the technique used to from the data island pattern on the master template. Like e-beam lithography, the use of self-assembled block copolymers cannot result in perfect placement of the features on the master template. This is primarily because the block copolymer components may expand or contract slightly during separation into their different phases. As a result, there will be the misplacement of some of the data islands and data tracks on all the disks nanoimprinted by the master template. Regardless of the manufacturing approach for the master pattern, drifts and offsets in the e-beam machine, which change with time, will result in misplacement of features on the master template, resulting in the same misplacement of the data islands and data tracks on all the disks nanoimprinted by the master template.

What is needed is a disk drive that compensates for misplacement of the data islands.

SUMMARY OF THE INVENTION

This invention relates to a disk drive with patterned-media disks that has information recorded in the servo sectors that identifies misplacement of the data islands in the data regions between the servo sectors. This misplacement information is read from the servo sectors prior to writing to correct either or both the radial position of the write head and the timing of the write pulses to the data islands. The misplacement information may include radial deviation of the data tracks, which is read by the read head and used by the servo electronics to make a fine adjustment of the radial position of the write head so it is precisely on track during writing. The misplacement information may also include circumferential or along-the-track misplacement of the data islands, which is read by the read head and used to adjust the phase of the write clock to precisely clock write pulses to the misplaced data islands. The misplacement information may also include the location of defective data islands, which is read by the read head and used to inhibit write clock pulses to the defective data islands. The misplacement information is measured, using an iterative process, for all data regions in all tracks of a disk nanoimprinted from the master template. Because all disks are made from the same master template, this iterative process needs to be performed only once on one disk and the misplacement data recorded and stored for later use during formatting or servo-writing of the disk drives.

For a fuller understanding of the nature and advantages of the present invention, reference should be made to the following detailed description taken together with the accompanying figures.

DETAILED DESCRIPTION OF THE INVENTION

Figure 1:
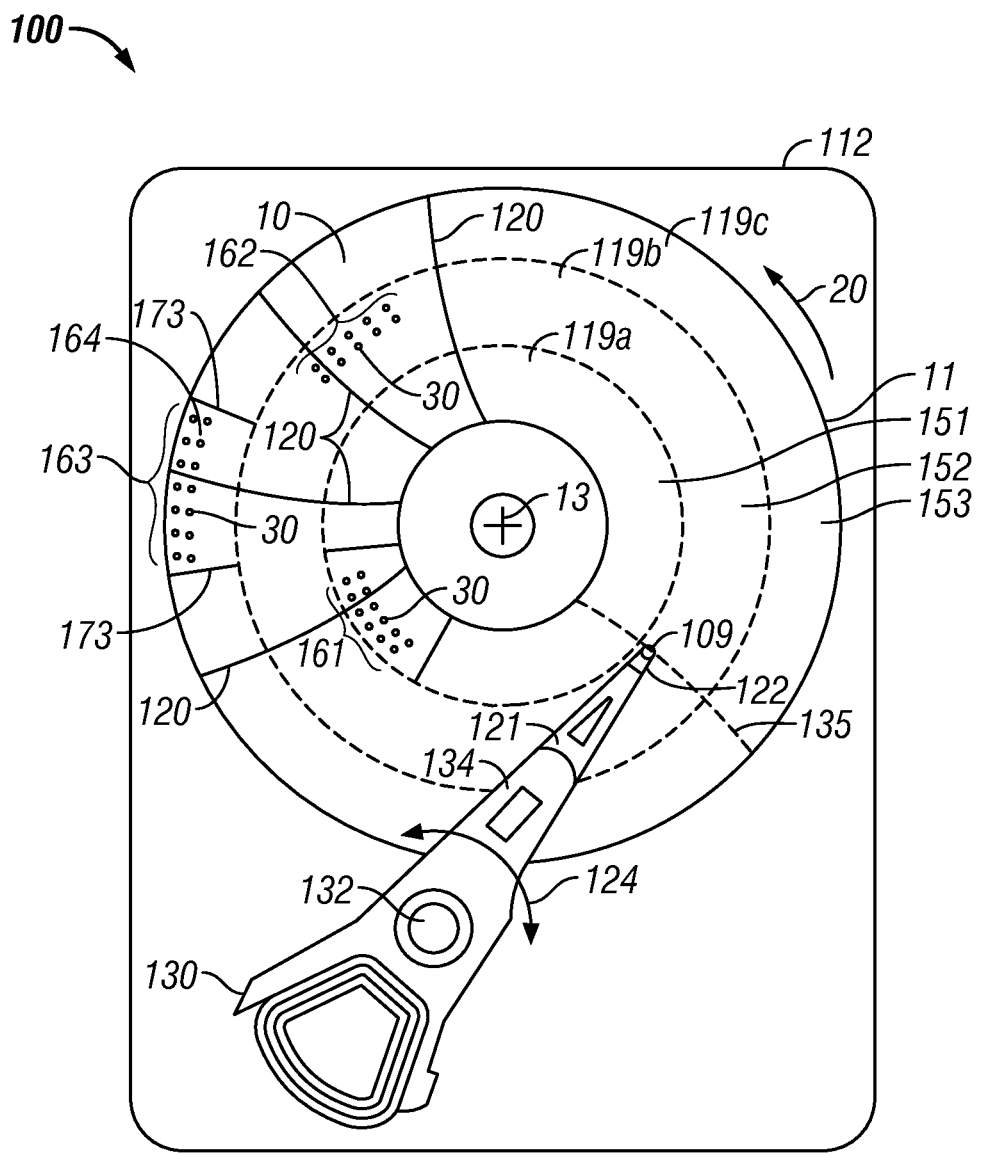
FIG. 1 is a top view of a patterned-media disk drive like that to which the present invention relates.

FIG. 1 is a top view of a patterned-media disk drive 100 like that to which the present invention relates. The drive 100 has a housing or base 112 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data islands 30 of magnetizable material on the substrate 11. The data islands 30 function as discrete magnetic bits for the storage of data. Each discrete data island 30 is a magnetized block separated from other blocks by nonmagnetic regions or spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the blocks to not adversely affect reading or writing. The nonmagnetic spaces between the data islands may also be the absence of magnetic material, such as grooves or troughs in the magnetic recording layer or disk substrate.

The data islands 30 are arranged in radially-spaced circular tracks, with the tracks being grouped into annular bands or zones 151, 152, 153. Within each track, the data islands 30 are typically arranged in fixed-byte-length data sectors (e.g., 512 bytes or 4096 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical sync marks 173 in zone 153. Each sync mark 173 may be plurality of circumferentially-spaced marks, with the spacing being different in each zone, that are detected by the read head to enable the write head to be synchronized with the specific spacing of the data islands in that zone. The data regions between successive sync marks, like data region 164 between sync marks 173 in zone 153, include multiple fixed-byte-length data sectors. The sync marks may be located in the sector headers of certain data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
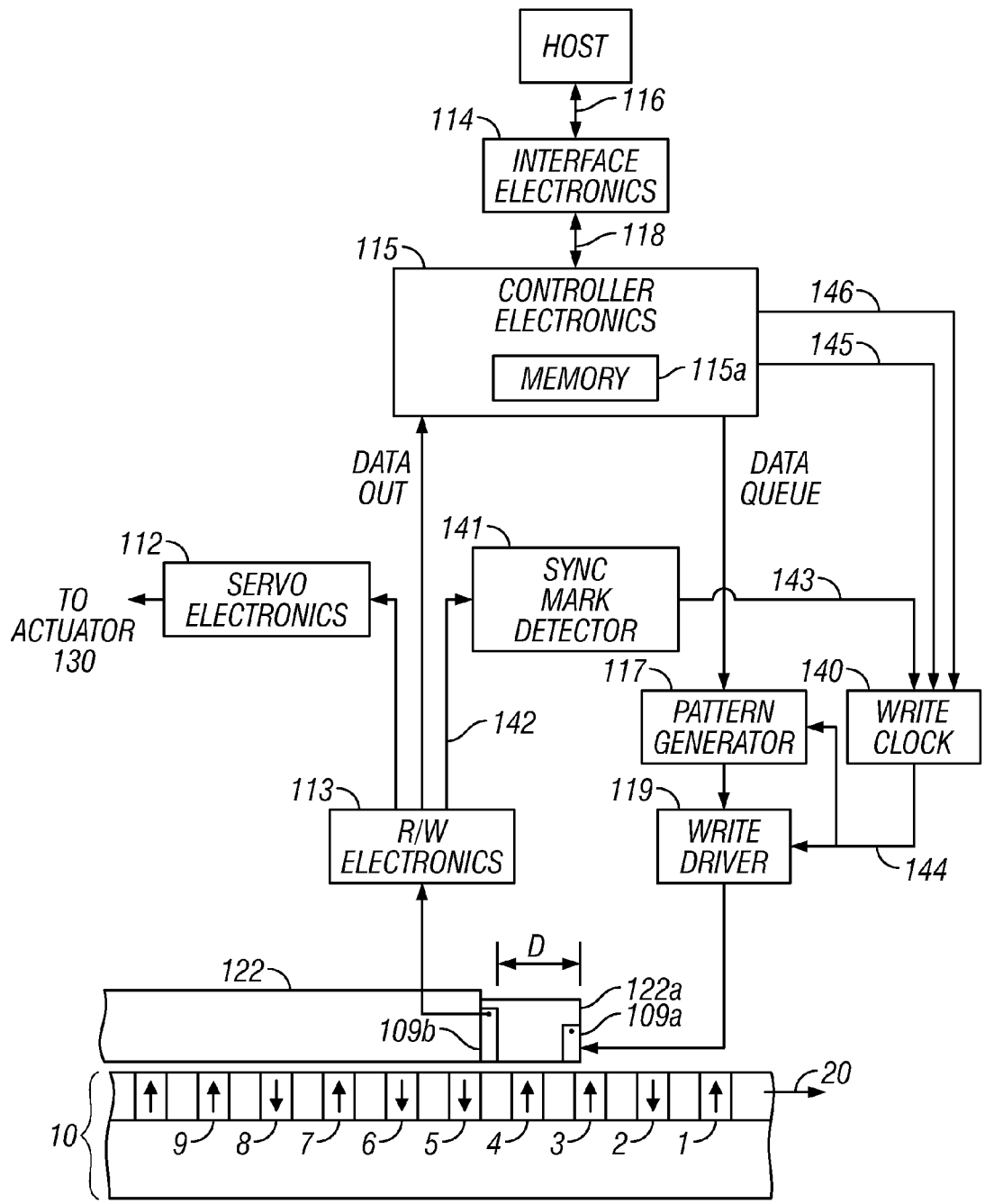
FIG. 2 is a block diagram of the electronics associated with the disk drive of the present invention and also shows a sectional view of the patterned magnetic recording disk.

FIG. 2 is a block diagram of the electronics associated with disk drive 100 and also shows a sectional view of the magnetic recording disk 10 with a magnetic recording layer of patterned media in the form of discrete magnetizable data islands 1-9. FIG. 2 also shows a portion of slider 122 with read/write head 109 that includes the read element or head 109b and the write element or head 109a. The read head 109b and write head 109a are formed on the trailing end 122a of slider 122. The arrows depicted in the islands 1-9 represent the magnetic moments or magnetization directions in the islands, and are depicted for perpendicular or out-of-plane magnetic recording. The recording or writing of data occurs by an inductive coil write head 109a that has a write pole that generates a magnetic field to magnetize the islands in one of the two magnetization directions, depending on the direction of current through the coil of the write head. Because there is no magnetic material between the islands 1-9, the write pulses must be precisely timed to magnetize the appropriate islands. While FIG. 2 illustrates perpendicular patterned media, wherein the islands 1-9 are depicted with their moments oriented out of the plane of the recording layer, the invention is fully applicable to horizontal or longitudinal patterned media, wherein the islands 1-9 would have their moments oriented in the plane of the magnetic recording layer.

The disk drive electronics include read/write (R/W) electronics 113, servo electronics 112, controller electronics 115 and interface electronics 114. The R/W electronics 113 receives signals from read head 109b and passes servo information from the servo sectors 120 to servo electronics 112 and data signals from the data sectors to controller electronics 115. Servo electronics 112 typically includes a servo control processor that uses the servo information from the servo sectors 120 to run a control algorithm that produces a control signal. The control signal is converted to a current that drives rotary actuator 130 to position the head 109. Interface electronics 114 communicates with a host system (not shown) over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts them into a set of numbers that uniquely identify the disk surface (head number associated with that disk surface), track and data sector. The numbers are passed to servo electronics 112 to enable positioning head 109 to the appropriate data sector.

FIG. 2 also shows schematically the transfer of data between a host system, such as a PC, and the disk drive 100. The signals from recorded data islands in the data sectors are detected by read head 109b, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates high-frequency current pulses to the coil of write head 109a which results in the magnetic write fields that magnetize the data islands 1-9. The write clock 140, which is capable of operating at different frequencies corresponding to the different data zones, outputs a clock signal on line 144 to control the timing of pattern generator 117 and write driver 119. Also, because disk drives are typically capable of inhibiting writing if there is some drive failure indication or track misregistration (TMR), the controller electronics 115 is also capable of sending a write inhibit signal on line 146 to the write clock 144. A sync mark detector 141 receives the readback signal from R/W electronics 113 on input line 142 and outputs a signal on line 143 to control the timing of write clock 140. The sync mark detector 141 detects the sync marks (like sync marks 173 in FIG. 1) from R/W electronics 113. The sync mark spacing in each zone is different so sync mark detector 141 enables the write clock 140 to be synchronized with the spacing of the data islands in each of the different zones. FIG. 2 also shows a physical spacing D in the circumferential or along-the-track direction between the read head 109b and the write head 109a.

Figure 3A:
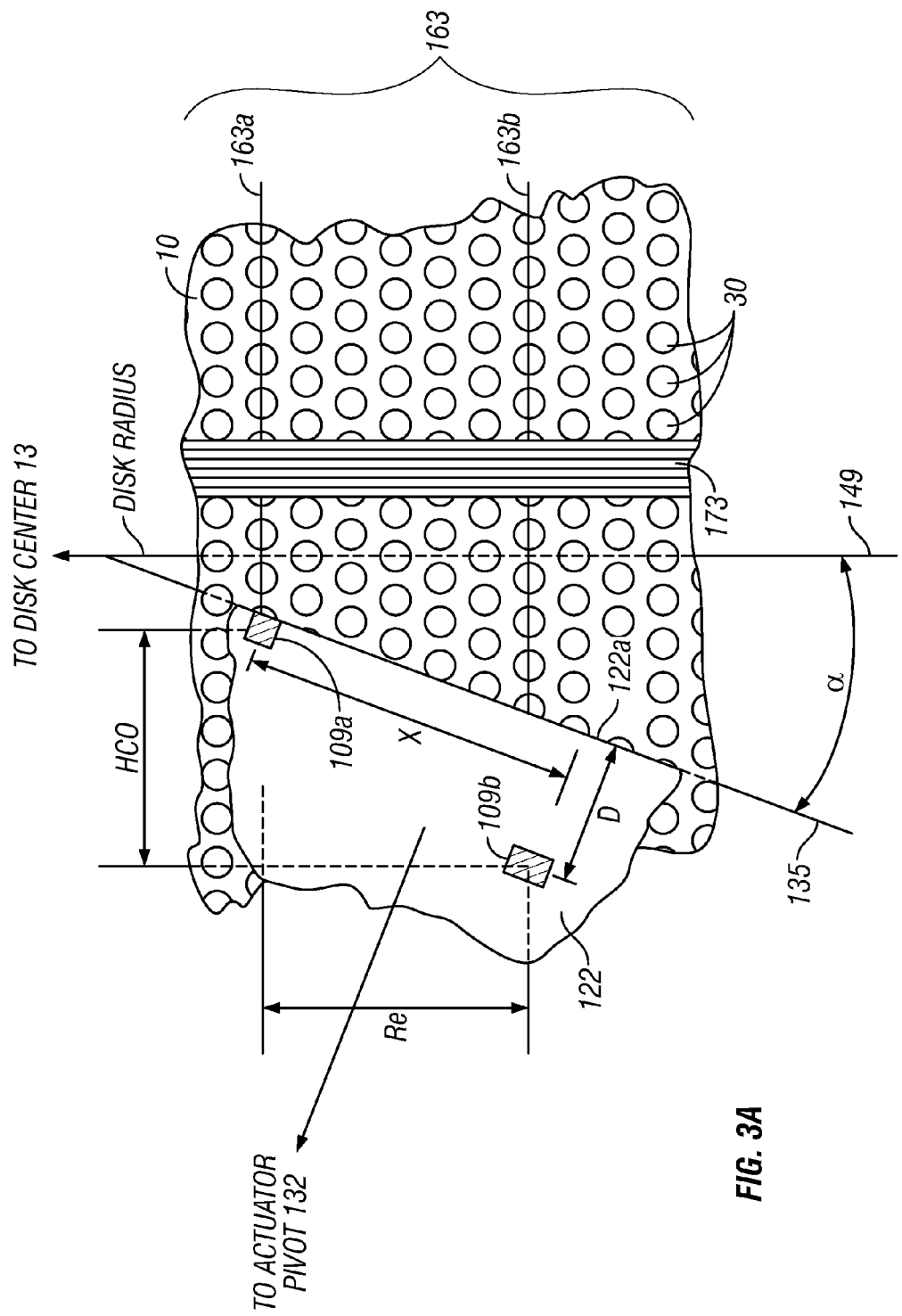
FIG. 3A is a top view of a portion of the slider on a surface of a patterned-media disk and shows the head circumferential offset (HCO) radial offset ($R_e$) between the read head and write head.

FIG. 3A is a top view of a portion of slider 122 on a surface of patterned-media disk 10 and shows the relationship between the read head 109b, write head 109a and typical patterned data tracks 163 with typical data islands 30. The data islands are depicted as circular, but the data islands may have other shapes, including generally elliptical or generally rectangular with different aspect ratios (radial height to circumferential width). FIG. 3A shows the physical spacing D in the generally circumferential or along-the-track direction between the read head 109b and the write head 109a. The physical spacing D is typically the same for all heads manufactured in the same fabrication process. Additionally, due to tolerances in fabrication there is typically also a radial or generally cross-track physical spacing X between the read head 109b and write head 109a. The cross-track spacing X is not the same for each head but typically has a statistical variation among the heads in the same fabrication process. Because the slider 122 is mounted to the rotary actuator that rotates about pivot 132 its path is an arcuate path 135 that is not aligned with the disk radius 149. As shown in FIG. 3A, the end face 122a of slider 122 makes an angle α (called the skew angle) with the disk radius 149, with skew angle α being a known function of disk radius and thus track number. As a result of the circumferential spacing D, cross-track spacing X and skew angle α, there is an effective radial offset $R_e$ between read head 109b and write head 109a, with the radial offset $R_e$ being a known function of track number. In a disk drive using patterned media with an areal density around 1 Terabit per square inch, the track pitch (the radial spacing between adjacent tracks) may be in the range of about 25 to 50 nm and the maximum skew angle α may be about 15 degrees. Manufacturing tolerances result in X being between +/−2.5 micron and D may be typically about 5 microns. As a result, the maximum $R_e$ may be about 2 microns, or as much as about 100 times the track pitch.

Figures 3B, 4:
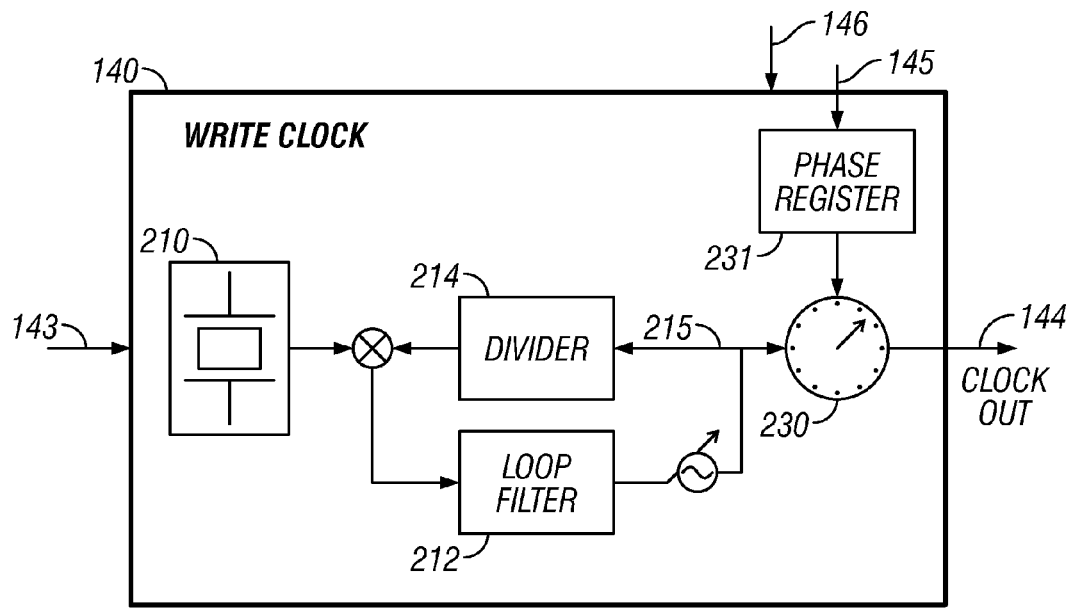
FIG. 3B is a lookup table showing effective radial offset ($R_e$) values and HCO values as a function of track number.
FIG. 4 is a block diagram of the write clock controlled by input from the synchronization (sync) mark detector with phase rotator controlled by input from the controller electronics.

Conventional approaches exist for measuring the effective read head/write head radial offset $R_e$ as a function of radius in a disk drive and storing this information in the disk drive's drive electronics for track-following control during reading and writing of data. For example, the disk drive may include a lookup table stored in memory 115a accessible by controller electronics 115. FIG. 3B is an example of a portion of a lookup table that shows track numbers (TR) and associated values of skew angle α and radial offset $R_e$ for every $10^{th}$ track between tracks n and n+30. It is typically not necessary for the lookup table to store values of $R_e$ for every track. Values for every N tracks, for example where N is 100 or 1000, can be stored in the lookup table and an interpolation method used to determine the values for a selected track. As an alternative to the use of a lookup table, the processor in controller electronics 115 may calculate $R_e$ for a selected track number from an equation stored in memory 115a, with the equation generated by a curve-fitting algorithm for values of track number and measured $R_e$ values.

This effective radial offset $R_e$ between the read head 109b and write head 109a means that when the write head 109a is positioned to write on a selected track 163a, the read head 109b will be positioned over a different track 163b, but more typically between two tracks. FIG. 3A shows $R_e$ as being a integer number of tracks, but $R_e$ is typically a non-integer value. For example, if Re had a value of 10.35 times the track pitch, then to write on target track #N, the actuator would position the read head to track #N+10, the servo positioning information would be read from tracks #N+10 and #N+11, and the read head would be maintained at a location where the position error signal (PES) value corresponded to a distance of 0.35 times the track pitch between tracks #N+10 and #N+11, at which time data would be written to track #N.

As shown in FIG. 3A, the head skew angle α results in a head circumferential offset (HCO) between the read head 109b and the write head 109a. As can be appreciated from FIG. 3A, because the skew angle α varies with disk radius, the value of HCO also varies with disk radius and can be calculated from the known values of D, α and the measured values of X and D. Thus, when the read head 109b detects a sync mark 173, the write head 109a will not be precisely aligned with that sync mark, but will be circumferentially offset by an amount HCO. Thus an adjustment to the phase of write clock 140 must be made to compensate for HCO to assure that the write pulses are synchronized to the location of the data islands 30 in the selected target track 163a where data is to be written.

FIG. 4 is a block diagram of the write clock 140. The write clock 140 may be a voltage-controlled oscillator (VCO) in a conventional phase-locked loop (PLL) with a crystal reference 210 and loop filter 212. The frequency and phase of write clock 140 is initially set by the sync mark detection signal 143 from sync mark detector 141. The divider 214 allows the write clock frequency to be adjusted, for example in multiples of a small fraction of the frequency of the crystal reference 210. This enables the PLL output 215 to be set to different output frequencies depending on the frequency of the data zone containing the selected track where data is to be written. The settings in divider 214 should be selected so the PLL output is as close as possible to the desired write clock frequency to minimize the average size of phase updates at phase rotator 230. The write clock signal is generated in equally-spaced primary phases, and by analog interpolation it is possible to generate clocks with a phase intermediate the primary phases. For example, the clock output at line 144 may be capable of 64 equally-spaced clock phases. The phase rotator 230, also called a "mixer", controls which clock phase is selected for output on line 144. The write clock 140 is also capable of inhibiting its output 144 upon receipt of a write inhibit signal on line 146 from controller electronics 115.

Also shown in FIG. 4 is the phase adjustment for HCO, shown as input 145 from controller electronics 115 to the phase rotator 230. The controller electronics 115 calculates HCO from the known relationship between HCO and the track number for the selected data track where data is to be written. This can be done by use of a lookup table. The lookup table in FIG. 3B shows values of HCO for every $10^{th}$ track between tracks TR(n) and TR(n+30), including the selected track TR(163a) where data is to be written and the track TR(163b) where the read head is located for the example of FIG. 3A. Alternatively, the processor in controller electronics 115 may calculate HCO for a selected track number from an equation stored in memory 115a, with the equation generated by a curve-fitting algorithm for values of track number and HCO. The phase adjustment value corresponding to HCO may stored in a phase register 231 for input to phase rotator 230. Thus with the correct phase adjustment, when the read head 109b detects sync marks in its track 163b, the write clock 140 will cause write pulses from write driver 119 to be precisely synchronized with the data islands in the selected data track 163a.

As shown in FIG. 3A, all the data island patterns in the tracks, including tracks 163a and 163b, are shown as being precisely placed and aligned circumferentially with one another, with no circumferential misalignment, other than an intended one-half island circumferential shift of the patterns in alternate tracks. The advantage of having the data island pattern in each track shifted in the along-the-track direction by one-half the island spacing from the islands in adjacent tracks is that any readback signal interference from an adjacent track will be out of phase with the readback signal from the track being read, which results in a substantially reduced error rate for the data being read. The data islands are also depicted in FIG. 3A as being precisely located radially with a precise constant track pitch.

The placement of the data islands and data tracks relative to one another is established when the master template for nanoimprinting the disks is produced. This is typically done using a rotary-stage e-beam lithography system, in which the master pattern for the patterned data tracks is produced on a track-by-track basis, or by groups of tracks at a time. However, drifts and offsets in the e-beam machine, which change with time, will result in misplacement of features on the master template, resulting in the same misplacement of the data islands and data tracks on all the disks nanoimprinted by the master template. Pending application Ser. No. 12/056,178, filed Mar. 26, 2008, published as US 20090244765 A1 and assigned to the same assignee as this application, describes a disk drive where a phase correction for a predictable drift of the e-beam machine is a function of disk radius and is included in a look-up table to adjust the phase of the write clock.

Guided self-assembly of block copolymers, alone or together with e-beam lithography, has also been proposed for making the master template for nanoimprinting the disks. A self-assembling block copolymer typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of block copolymers that can be used for forming the self-assembled periodic patterns. If one of the components A or B is selectively removable without having to remove the other, then an orderly arranged structural units of the un-removed component can be formed. In pending application Ser. No. 12/141,062, filed Jun. 17, 2008, published as US 20090308837 A1 and assigned to the same assignee as this application, a method for making a master template is described that first uses e-beam lithography to form a pattern of generally radial stripes on a substrate, with the stripes being grouped into annular zones or bands. Then a block copolymer material is deposited on the pattern, resulting in guided self-assembly of the block copolymer into its components to multiply the generally radial stripes into generally radial lines. Concentric rings are then lithographically patterned over the generally radial lines. After etching, using one of the block copolymer components as an etch mask, and resist removal, the master template has pillars arranged in circular rings, with the rings grouped into annular bands. Like e-beam lithography, the use of self-assembled block copolymers may be affected by occasional placement errors or defective features. These errors or defects may occur due to malformation during self-assembly or due to excessive misguiding by the e-beam-generated guiding features. As a result, there will be the misplacement of some of the data islands and data tracks on all the disks nanoimprinted by the master template.

In this invention misplacement of the data islands in the data regions between the servo sectors is detected and information representative of the misplacement is recorded in the servo sectors. This misplacement information is then read from the servo sectors prior to writing to correct either or both the radial position of the write head and the timing of the write pulses. The misplacement information may include radial deviation of the data tracks, which is read by the read head and used by the servo electronics to make a fine adjustment of the radial position of the write head so it is precisely on track during writing. The misplacement information may also include circumferential or along-the-track misplacement of the data islands, which is read by the read head and used to adjust the phase of the write clock to precisely clock write pulses to the misplaced data islands. The misplacement information may also include the location of defective data islands, which is read by the read head and used to inhibit the write clock pulses to the data defective islands.

Figure 5:
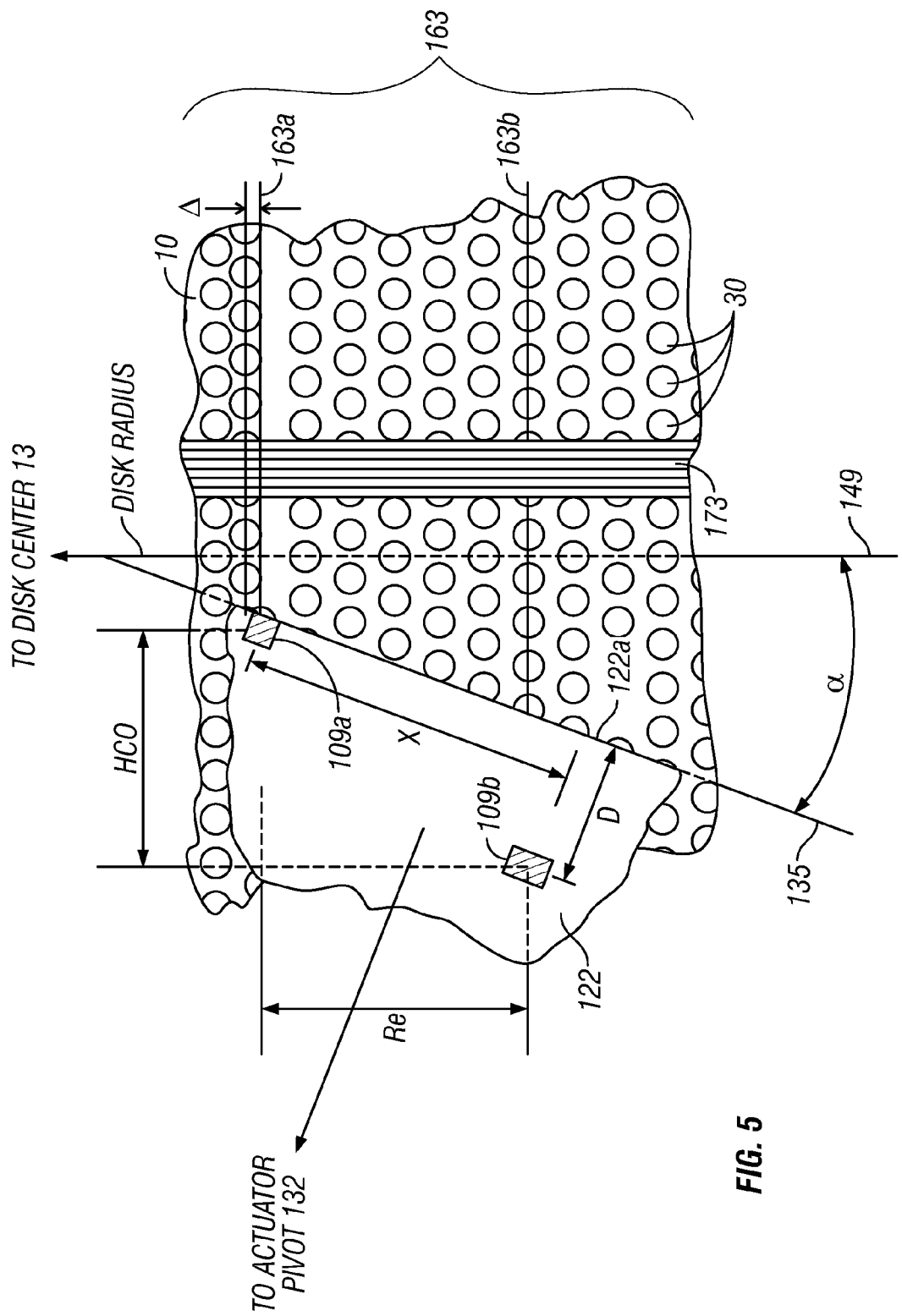
FIG. 5 is a top view like FIG. 3A but shows some of the data islands in a data region misplaced or shifted by a radial deviation Δ from where the true centerline of the data track should be.

FIG. 5 shows an example where some of the data islands in a data region (the region between two servo sectors) in track 163a are misplaced or shifted by a radial deviation Δ from where the true centerline of track 163a should be. The value of Δ is stored as a series of bits in the servo sector preceding the data region containing the misplaced data islands. When the controller electronics 115 (FIG. 2) passes to servo electronics 112 the set of numbers that identifies the data sector in track 163a as the data sector where data is to be written, servo electronics 112 recalls the value of $R_e$ for track 163a. Without correction for the radial deviation Δ the actuator would then position the read head 109b to the centerline for track 163b, which would result in the write head 109a being radially shifted by an amount Δ from the actual centerline of track 163a. However, the read head 109b reads, from the preceding servo sector of track 163b, the misplacement information bits that correspond to the value Δ. This radial deviation value Δ corresponds to a PES increment that is added (or subtracted, depending on the radial direction of the shift of the misplaced data islands) to the value $R_e$. This results in a radial shift of the read head 109b and thus correct radial positioning of the write head 109a to the centerline of track 163a.

An iterative method is used during servo-write or formatting of the disk drive to gather the radial deviation data to record in the servo sectors. First, the read head is centered on an initial track (for example track 163b) with a minimization of the PES and a test signal is written in a data region of the target write track (for example track 163a) and then read back. With each successive iteration of writing and reading, a slight radial adjustment is made. This method will lead to a value of the PES that gives a maximum readback signal. This value of PES is stored as the radial deviation Δ in the preceding servo sector for the read track (for example track 163b) and represents the write head radial deviation from target track 163a. This iterative method can then be repeated for all data regions and all tracks on the disk. However, because all disks are made from the same master template, this iterative process needs to be performed only once on one disk and the data recorded and stored for later use in formatting other disk drives.

Figure 6:
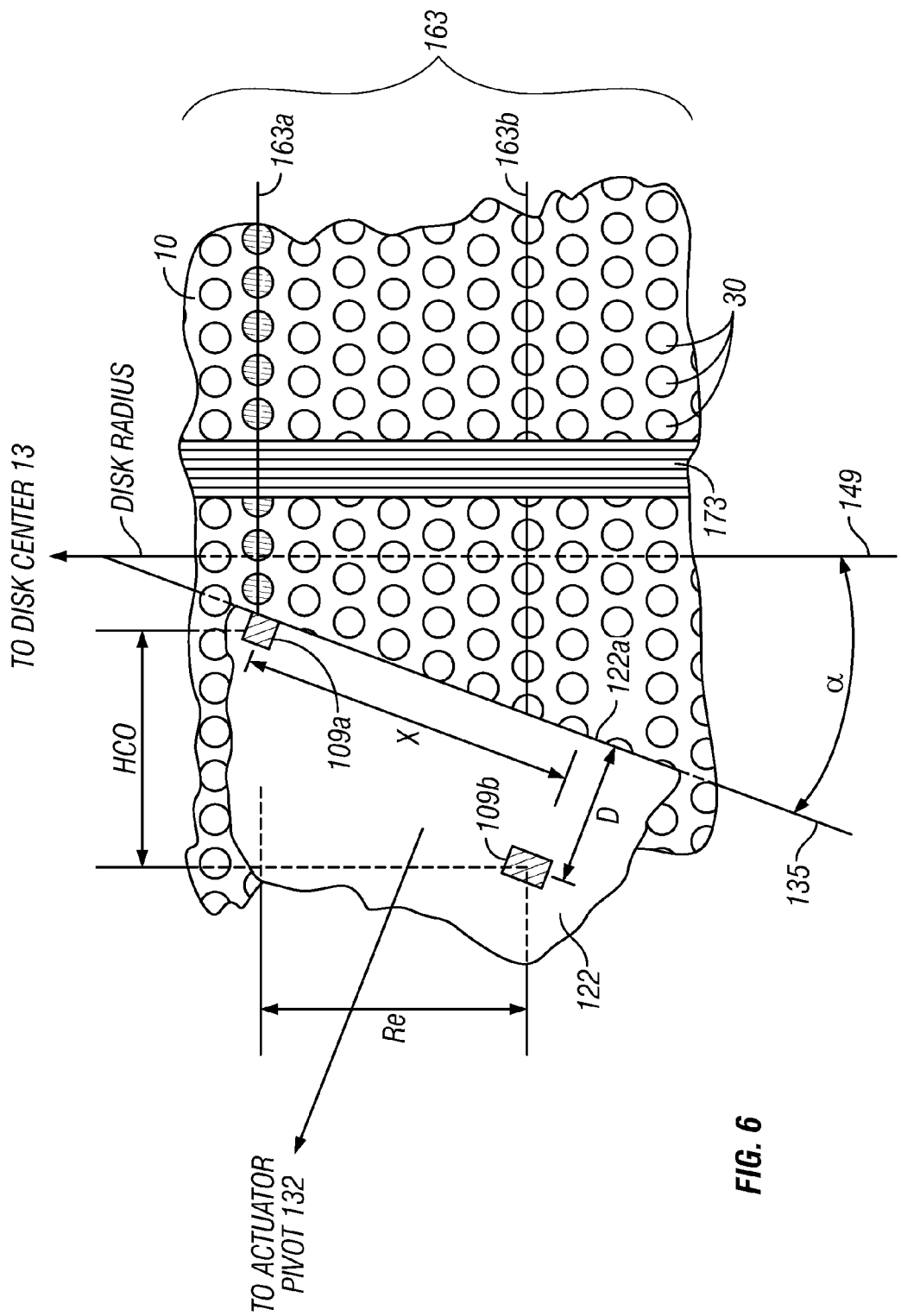
FIG. 6 is a top view like FIG. 3A but shows an example where some of the data islands in a data region are misplaced circumferentially or in the along-the-track direction.
Figure 7A:
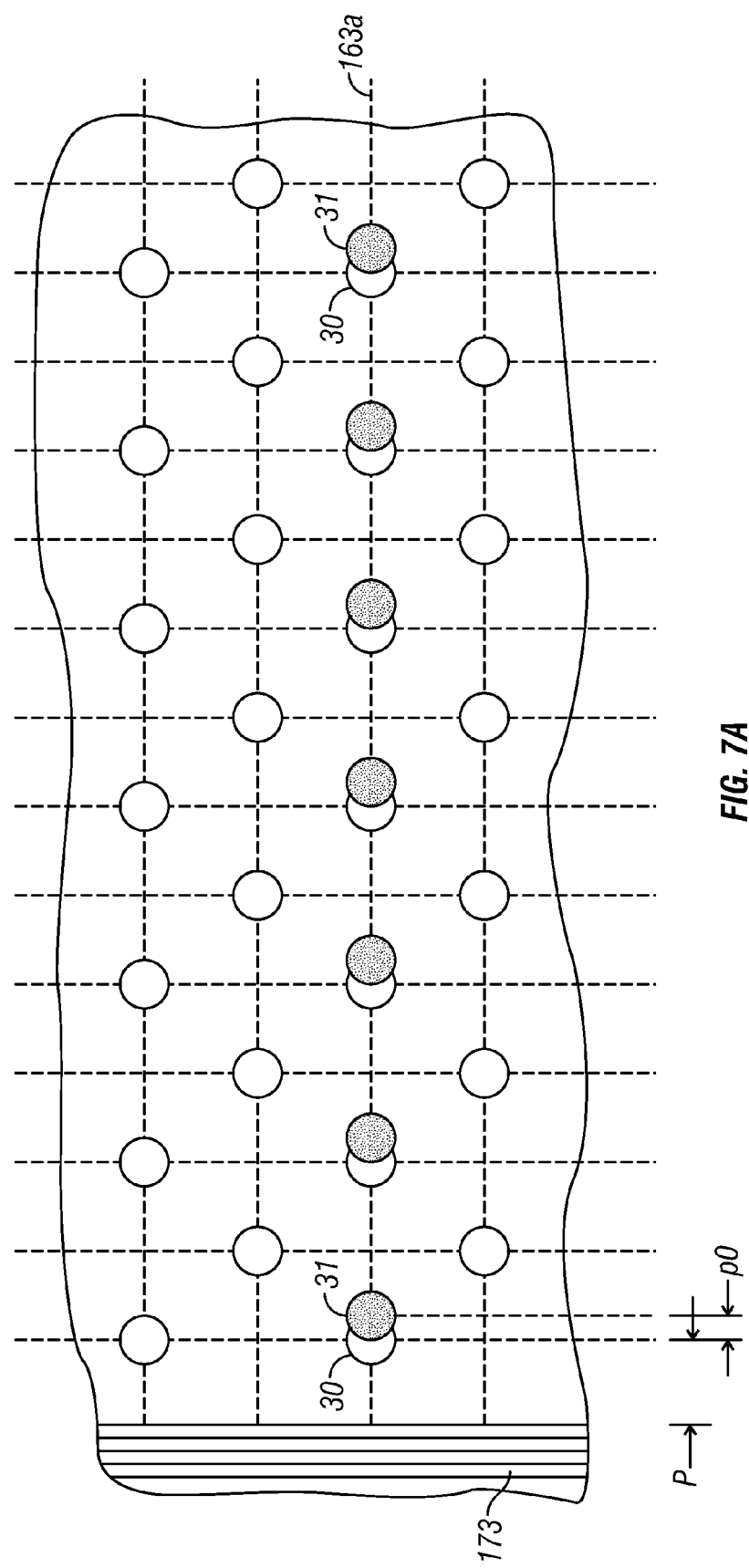
FIG. 7A illustrates one example of circumferential misplacement of the data islands wherein all of the data islands are shifted by the same amount in the along-the track direction.
Figure 7B:
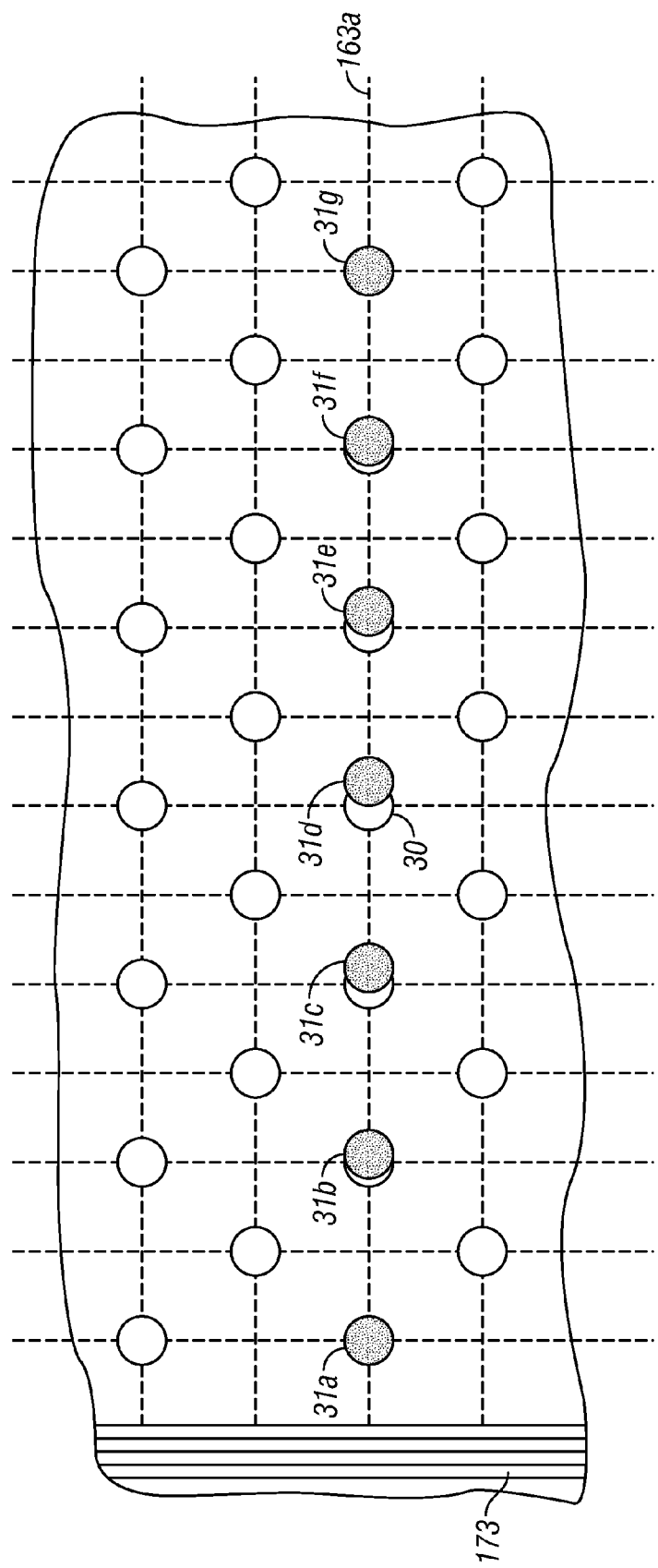
FIG. 7B illustrates another example of circumferential misplacement of the data islands wherein the data islands are shifted from their desired location but this shift is not the same for all data islands.

FIG. 6 shows an example where some of the data islands in a data region in track 163a (depicted as shaded data islands) are misplaced circumferentially or in the along-the-track direction. Because the write clock is controlled by the sync marks 173, this circumferential misplacement of the data islands means that the write clock will be out of phase with the data islands. The optimum phase correction or adjustment is measured for each data region of each track and stored in the servo regions. FIGS. 7A-7B illustrate two common examples of circumferential misplacement of the data islands requiring a phase adjustment of the write clock. If FIG. 7A, all of the data islands, or a large number of them, in track 163a in data region are shifted by the same amount in the along-the track direction. This is shown by the data islands 30, which represent the desired precise placement P from a sync mark 173 in data track 163a, and misplaced data islands 31 being shifted by an amount p0 from their desired location. In FIG. 7B, all of the data islands, or a large number of them, in track 163a in a data region are shifted from their desired location but this shift is not the same for all data islands. For example, data islands 31a and 31g are at their desired precise location, but data islands 31b-31d are shifted by different amounts from their desired precise locations, with data island 31d showing the greatest shift relative to a precisely located data island 30. This type of island circumferential misplacement may occur because the block copolymer components used in making the master template may expand or contract slightly during separation into their different phases. In this type of circumferential misplacement there will be some optimal phase adjustment p0 that will result in correct timing of the write pulses to write the misplaced data islands. The term p0 is the phase adjustment value representing the circumferential misplacement of the data islands in the data region of data track 163a. This value is stored in the servo sector of track 163b preceding the data region corresponding to the data region of track 163a where the data islands are circumferentially misplaced.

For the circumferentially misplaced data islands of FIG. 6, when the controller electronics 115 (FIG. 2) passes to servo electronics 112 the set of numbers that identifies the data sector in track 163a as the data sector where data is to be written, servo electronics 112 recalls the value of $R_e$ for track 163a, and the actuator positions the read head 109b to the centerline for track 163b. The read head 109b then reads the circumferential misplacement information (phase adjustment p0) from the servo sector in track 163b preceding the data region corresponding to the data region of the target track 163a where data is to be written. The phase adjustment value corresponding to p0 may stored in a phase register 231 for input to phase rotator 230. Thus with the correct phase adjustment, when the read head 109b detects sync marks in its track 163b, the write clock 140 will cause write pulses from write driver 119 to be synchronized with the misplaced data islands in the target data track 163a. However, the controller electronics 115 must also adjust the phase of the write clock for HCO, which is a predictable phase adjustment that is recalled from a table (FIG. 3B) or calculated as a function of radius. Thus the signal on line 145 is the sum of the calculated phase adjustments required for both p0 and HCO.

In this invention, the p0 values for all the data regions in all the data tracks can be measured on one disk and recorded and stored for later use in formatting all the other disk disks. However, because the master pattern is replicated over large volumes of disks by nanoimprinting from a master template, it is only necessary to measure the p0 values once, and write the same measured p0 values in the servo sectors of all disks made from that master template. Because the master patterns used for the two different surfaces of the disk might be different, separate measured p0 data can be provided for each disk surface.

One method to measure the p0 values of the data regions (the regions between two successive sync marks) in the tracks is to directly measure the data islands using a tool like a scanning electron microscope (SEM) or atomic force microscope (AFM) that has accuracy in the nanometer range. Nanometer-scale accuracy is required because the island spacing for patterned media is on the order of about 10 nm, and the write synchronization needs to be controlled to a small fraction of the island period. Another p0 measurement method is to make write synchronization measurements on a disk made with the master template using a read/write head with known physical offsets, i.e., known values of D and X. The write head 109a then writes to the data regions on the write track 163a with a specific phase relative to a defined mark on the read track 163b, but with a frequency slightly shifted with respect to the known island period of the write track 163a. A slightly shifted frequency is equivalent to a constantly shifting phase. The written track is then read back. By reading back which data regions show good synchronization (i.e., low bit error rate) and which data regions show poor synchronization (i.e., high bit error rate), the optimal phase relationship between the written data region and the corresponding data region the read head is on can be determined. This optimal phase corresponds to the desired phase adjustment for that particular data region. This iterative process is then repeated for each data region in each data track.

Figure 8:
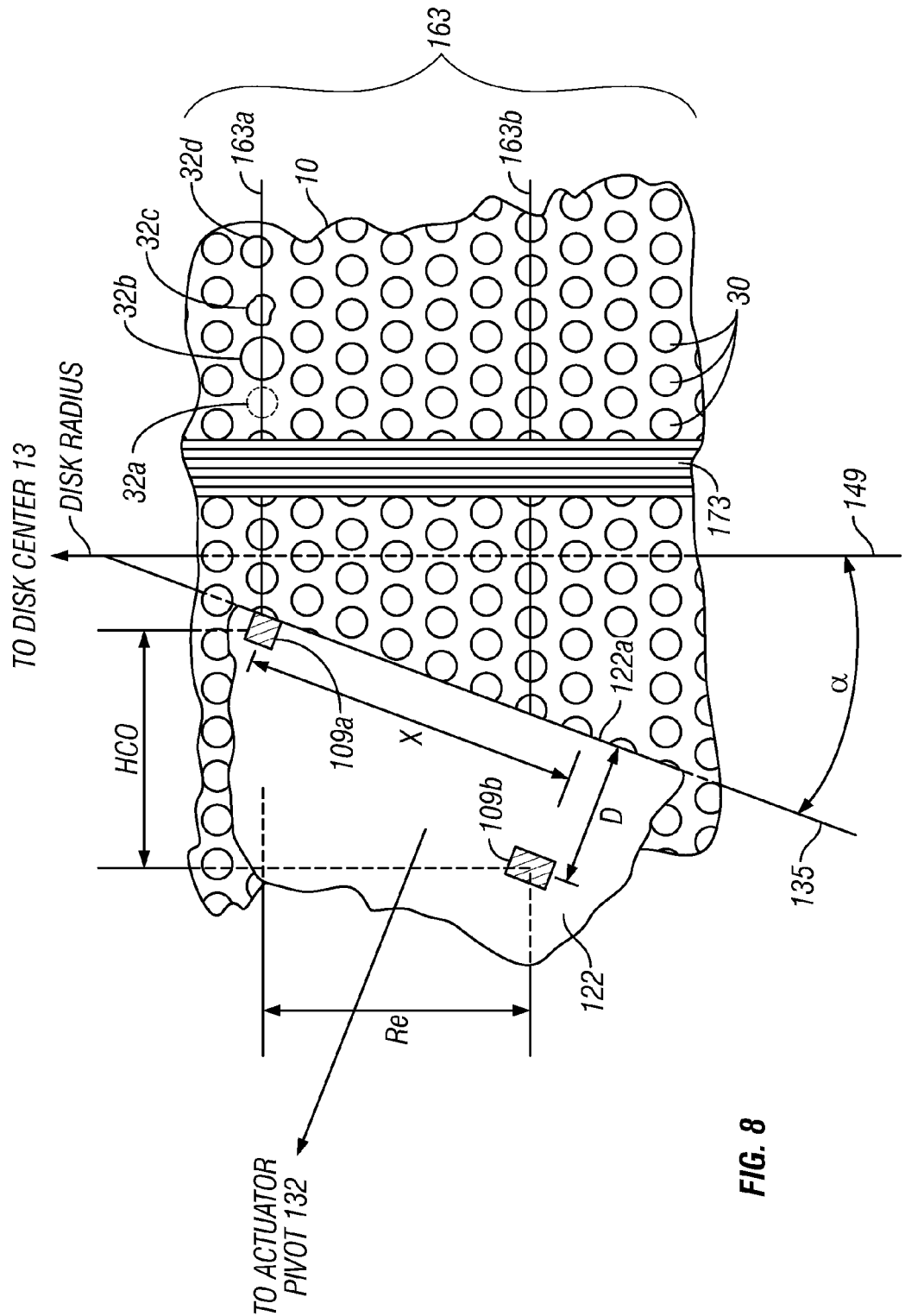
FIG. 8 is a top view like FIG. 3A but shows an example where some of the data islands in are defective data islands.

FIG. 8 shows an example where some of the data islands in a data region in track 163a are defective data islands. The misplacement information represents the location for these defective islands. Examples of defective data islands include a missing island 32a, an island 32b formed as a "double" island, a physically corrupted island 32c, or an island located 32d greater than 3-sigma from its desired precise location. The misplacement information in the servo sectors identifies the portion of the data region, for example which quadrant of the data region, that contains the defective islands. For the defective data islands of FIG. 8, when the controller electronics 115 (FIG. 2) passes to servo electronics 112 the set of numbers that identifies the data sector in track 163a as the data sector where data is to be written, servo electronics 112 recalls the value of $R_e$ for track 163a, and the actuator positions the read head 109b to the centerline for track 163b. The read head 109b then reads the defective data island information, e.g., a two-bit value corresponding to data region quadrants 0, 1, 2 or 3, respectively. The controller electronics 115 then sends a corresponding write inhibit signal on line 146 (FIG. 2) to the write clock 140. This turns off the write clock 140 at the proper time and for the proper duration so that there is no clock signal on line 144 when that quadrant of the data region passes the write head 109b. Alternatively, an extra 4 bits of error correction code (ECC) could be added that would only apply to the designated quadrant to assist in reconstructing the data. The location of these extra ECC bits could be added at the location of the existing ECC data.

The method for measuring the location of defective islands can be essentially the same as the above-described method for measuring the p0 values. The data regions (the regions between two successive sync marks) can be measured using a tool like a scanning electron microscope (SEM) or atomic force microscope (AFM) that has accuracy in the nanometer range, and the locations of defective islands identified, for example as being in a particular quadrant of a data region. The iterative method of making write synchronization measurements on a disk made with the master template using a read/ write head with known physical offsets, i.e., known values of D and X, can also be used. By reading back which portions (e.g., quadrants) of which data regions show unacceptable or no synchronization (i.e., an unacceptably high bit error rate) these portions of the data regions can be identified and their locations recorded in the servo sectors, for example as a two-bit value representing quadrants 0, 1, 2 or 3. This iterative process is then repeated for each data region in each data track.

Figure 9:
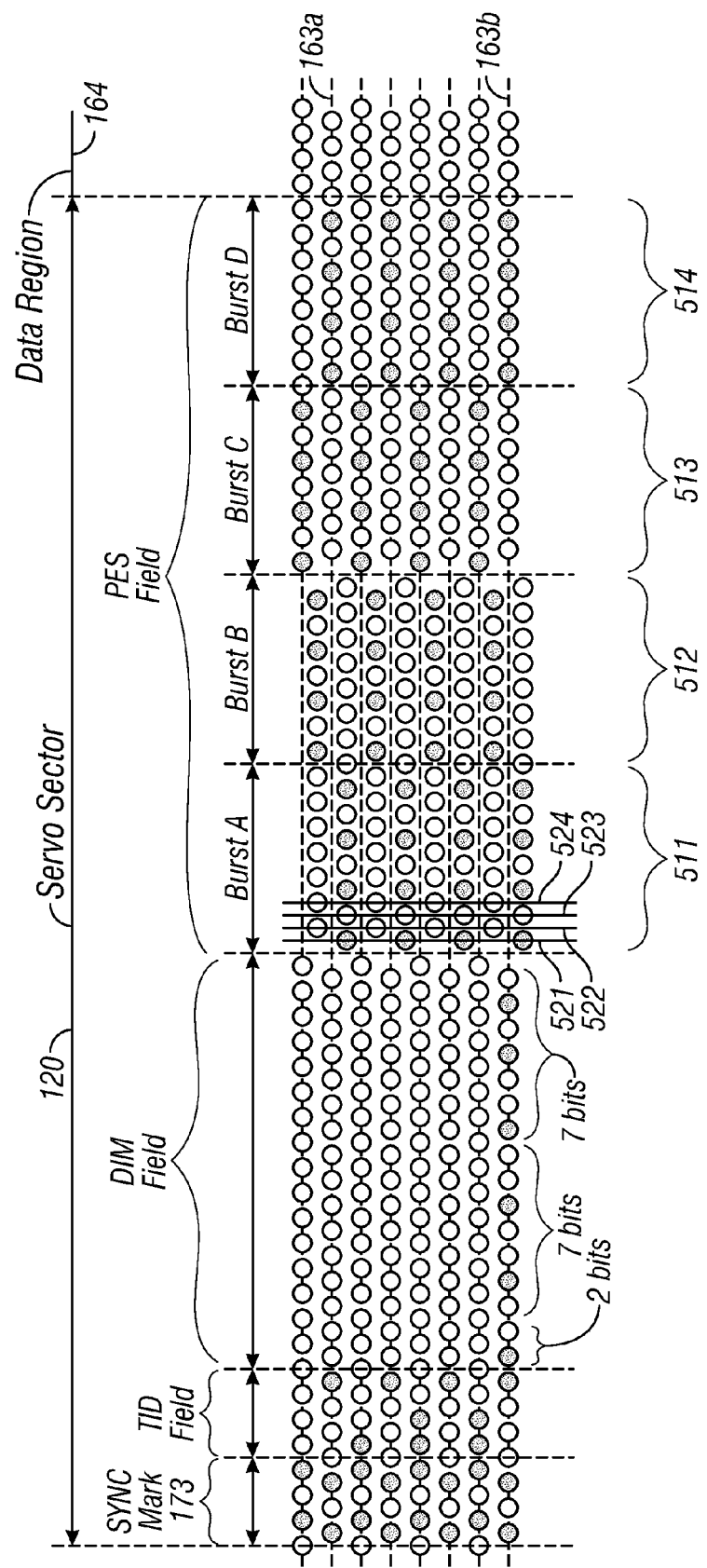
FIG. 9 is an enlarged view of a single servo sector showing the conventional fields and the data island misplacement (DIM) field according to this invention.

FIG. 9 is an enlarged view of a single servo sector 120 showing the conventional fields and the data island misplacement (DIM) field according to this invention. The horizontal dotted lines in FIG. 9 illustrate the centerlines of data tracks, including tracks 163a and 163b. The shaded islands in FIG. 9 represent one polarity of magnetization (e.g., perpendicular or into or out of the page in FIG. 9), while the white islands represent the opposite polarity. The islands in data region 164 represent actual user data and will thus have a complex magnetization pattern utilizing both polarities. In this example the sync mark 173 is located within servo sector 120 and can also function as the servo timing mark (STM) or servo identification (SID) mark indicating the start of the servo sector. Servo sector 120 also typically includes a track identification (TID) field and a PES field that may include burst fields (A-D), represented as fields 511-514. The islands in fields A-B are shown as being radially shifted by one-half track from the islands in fields C-D. As the read head traverses the PES field, the amplitude of the various bursts A through D will vary in amplitude, depending on the radial position of the center of the read head with respect to the centerline of the track.

The DIM field is preferably located between the TID field and the PES field. In this example it is shown with 16 bits in each track, with these bits representing data island misplacement information for the corresponding track determined from the read/write head offset. Thus the 16 bits in the DIM field of track 163b represent data island misplacement information for the data region of track 163a. For each track, the first 2 bits can identify the data region quadrant that contains defective data islands, the next 7 bits can identify the radial deviation value Δ, and the last 7 bits can identify the phase adjustment value p0. In FIG. 9, only track 163b is depicted with recorded bits in the DIM field. However, each track will typically have a different bit pattern in the DIM field. Of course, it is likely that a large number of data regions will have no misplaced data islands so the bits in the DIM field of the servo sectors in the corresponding tracks will be all zeros.

The islands in servo sector 120 in FIG. 9 are illustrated as hexagonal-close-packed (HCP) arrays of rows of islands that are highly ordered as a result of self-assembly. The HCP ordering of the arrays of islands creates a plurality of radial columns of islands. Vertical lines 521-524 illustrate four radial columns of islands in field 511. Because of the HCP ordering, the radial columns are formed from islands in alternating rows. In other words, the radial columns are not formed from islands in consecutive rows due to the HCP ordering, but are formed from islands in every other row. FIG. 9 illustrates a very small portion of the disk and thus illustrates the HCP ordering of the islands on a local scale. As a result of the servowriting process, the islands of a first radial column 521 have a first polarity (indicated by black islands), and the islands of the next three radial columns 522-524 have a second polarity (indicated by white islands). This pattern in the successive radial columns is repeated in burst fields A-D (i.e., from left to right in FIG. 9). The terms "first" and "second" polarity are used to describe opposite or antiparallel polarities. For example, in perpendicular recording, a first polarity may refer to an island having a magnetization pointing out of the page in FIG. 9. A second polarity may refer to an island having a magnetization pointing into the page in FIG. 9.

The servowriting of the islands to have the desired pattern of magnetization, like the typical pattern of the PES field, and to record the bits in the DIM field, may be performed in the disk drive system using the disk drive's read/write head. More typically, however, the servowriting is performed in a separate dedicated servowriter that also has a read head, a write head and an actuator for moving the heads to the desired tracks.

The system and method as described above and illustrated with various block diagrams may be implemented in conventional analog or digital hardware components or in software. The servo control processor, the processor in the controller electronics, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
 a rotatable magnetic recording disk having a plurality of generally circular data tracks, a plurality of angularly spaced synchronization marks extending generally radially across the data tracks, and a plurality of angularly spaced servo sectors extending generally radially across the data tracks, the data tracks being patterned into discrete circumferentially spaced magnetizable data islands, the data islands being grouped into data regions located between the servo sectors, each data region being grouped into a plurality of data sectors, and wherein the servo sectors contain positioning information and data island misplacement information for the data islands;
 a controller for selecting the data tracks and data sectors where data is to be written;
 a write head for writing data to the data sectors by generating write pulses to magnetize the data islands in the data sectors;
 a write clock coupled to the write head for controlling the write pulses to the data islands;
 a read head for sensing the synchronization marks and reading the positioning information and data island misplacement information in the servo sectors;
 an actuator coupled to the read head and write head for moving the write head to the data tracks and maintaining the write head on the data tracks in response to positioning information read by the read head;
 synchronization mark detection circuitry coupled to the read head for controlling the write clock; and
 write clock adjustment circuitry responsive to the data island misplacement information read by the read head for adjusting the timing of the write clock pulses to the data islands.

2. The disk drive of claim 1 wherein the read head is radially offset from the write head, each data track having an associated read head radial offset value whereby when the write head is on a selected data track the positioning information read by the read head generates a position error signal (PES) representative of said radial offset value, and wherein the data island misplacement information represents a radial deviation from said radial offset value.

3. The disk drive of claim 2 wherein the actuator is responsive to data island misplacement information representative of said radial deviation read by the read head for moving the write head by said radial deviation.

4. The disk drive of claim 1 wherein the data island misplacement information represents a circumferential misplacement of the data islands and wherein the write clock adjustment circuitry comprises phase adjustment circuitry for adjusting the phase of the write clock by a phase adjustment amount corresponding to said circumferential misplacement.

5. The disk drive of claim 4 wherein the read head and write head are circumferentially offset from each other, each data track having an associated head circumferential offset value, and wherein the phase adjustment circuitry is responsive to the head circumferential offset associated with said selected data track.

6. The disk drive of claim 4 wherein the data island misplacement information represents a fixed amount of circumferential misalignment of the data islands.

7. The disk drive of claim 1 wherein the data island misplacement information represents defective data islands and wherein the write clock adjustment circuitry comprises circuitry for inhibiting write clock pulses to said defective islands.

8. The disk drive of claim 7 wherein said circuitry for inhibiting write clock pulses inhibits write clock pulses to all of the data islands in a portion of the data region containing said defective islands.

9. The disk drive of claim 8 wherein the data island misplacement information representative of defective data islands comprises two bits for identifying four quadrants of a data region.

10. The disk drive of claim 1 wherein the write clock has adjustable phases and wherein the write clock adjustment circuitry comprises phase adjustment circuitry including a phase register, and wherein the phase of the write clock is adjusted by the value in said phase register.

11. The disk drive of claim 1 wherein the synchronization marks are located within the servo sectors.

12. The disk drive of claim 1 wherein the data tracks are grouped into a plurality of radially spaced bands, and wherein the write clock operates at a unique frequency unique for each of the bands.

13. A magnetic recording disk drive comprising:
 a rotatable magnetic recording disk having a plurality of generally circular data tracks, a plurality of angularly spaced synchronization marks extending generally radially across the data tracks, and a plurality of angularly spaced servo sectors extending generally radially across the data tracks, the data tracks being patterned into discrete circumferentially spaced magnetizable data islands, the data islands being grouped into data regions located between the servo sectors, each data region being grouped into a plurality of data sectors, and wherein the servo sectors contain positioning information and data island circumferential misplacement information for the data islands;
 a controller for selecting the data tracks and data sectors where data is to be written;
 a write head for writing data to the data sectors by generating write pulses to magnetize the data islands in the data sectors;
 a write clock having adjustable phases and coupled to the write head for controlling the write pulses to the data islands;

a read head for sensing the synchronization marks and reading the positioning information and data island circumferential misplacement information in the servo sectors; wherein the read head and write head are circumferentially offset from each other, each data track having an associated head circumferential offset (HCO) value;

an actuator coupled to the read head and write head for moving the write head to the data tracks and maintaining the write head on the data tracks in response to positioning information read by the read head;

synchronization mark detection circuitry coupled to the read head for controlling the write clock; and phase adjustment circuitry for adjusting the phase of the write clock by the HCO value associated with said selected data track to be written and by a phase adjustment amount (p0) corresponding to said circumferential misplacement information read by the read head.

14. The disk drive of claim 13 wherein the data island circumferential misplacement information represents a fixed amount of circumferential misalignment of the data islands.

15. The disk drive of claim 13 wherein the phase adjustment circuitry includes a phase register, and wherein the phase of the write clock is adjusted by the value in said phase register.

16. The disk drive of claim 13 wherein the synchronization marks are located within the servo sectors.

17. The disk drive of claim 13 wherein the data tracks are grouped into a plurality of radially spaced bands, and wherein the write clock operates at a unique frequency for each of the bands.

* * * * *